(12) United States Patent
Huang

(10) Patent No.: US 7,769,930 B2
(45) Date of Patent: Aug. 3, 2010

(54) KEYBOARD-VIDEO-MOUSE CABLE HAVING INDICATOR FOR INDICATING SWITCHING STATUS

(75) Inventor: Shih Yuan Huang, Sijhih (TW)

(73) Assignee: ATEN International Co., Ltd., Shijr (TW)

( * ) Notice: Subject to any disclaimer, the term of this patent is extended or adjusted under 35 U.S.C. 154(b) by 165 days.

(21) Appl. No.: 11/619,260

(22) Filed: Jan. 3, 2007

(65) Prior Publication Data
US 2008/0162752 A1 Jul. 3, 2008

(51) Int. Cl.
G06F 13/12 (2006.01)
G06F 3/00 (2006.01)

(52) U.S. Cl. .............................. 710/62; 710/16; 710/17; 710/18; 710/19; 710/73

(58) Field of Classification Search ........................ None
See application file for complete search history.

(56) References Cited

U.S. PATENT DOCUMENTS 6,979,223 B2* 12/2005 Chen ........................... 439/490

2006/0203460 A1* 9/2006 Aviv ........................... 361/788

* cited by examiner

*Primary Examiner*—Alan Chen
(74) *Attorney, Agent, or Firm*—Chen Yoshimura LLP

(57) ABSTRACT

The present invention discloses a Keyboard-Video-Mouse (KVM) cable capable of indicating at least one switching status of a KVM switch for at least one computer coupled thereto. The KVM cable further comprises a set of transmission lines for transmitting indicating signals from the KVM switch to the indicator. The KVM cable comprises a plurality of connectors. A first indicator may be disposed on a first connector for indicating a console switching status. A second indicator may be disposed on a second connector for indicating a peripheral switching status. Alternatively, both the first and second indicators can be disposed on the same connector for indicating the console switching status and the peripheral switching status respectively. Moreover, a color mixing LED may also be disposed on either of the first and second connectors for indicating the console switching status and the peripheral switching status by different colors.

28 Claims, 9 Drawing Sheets

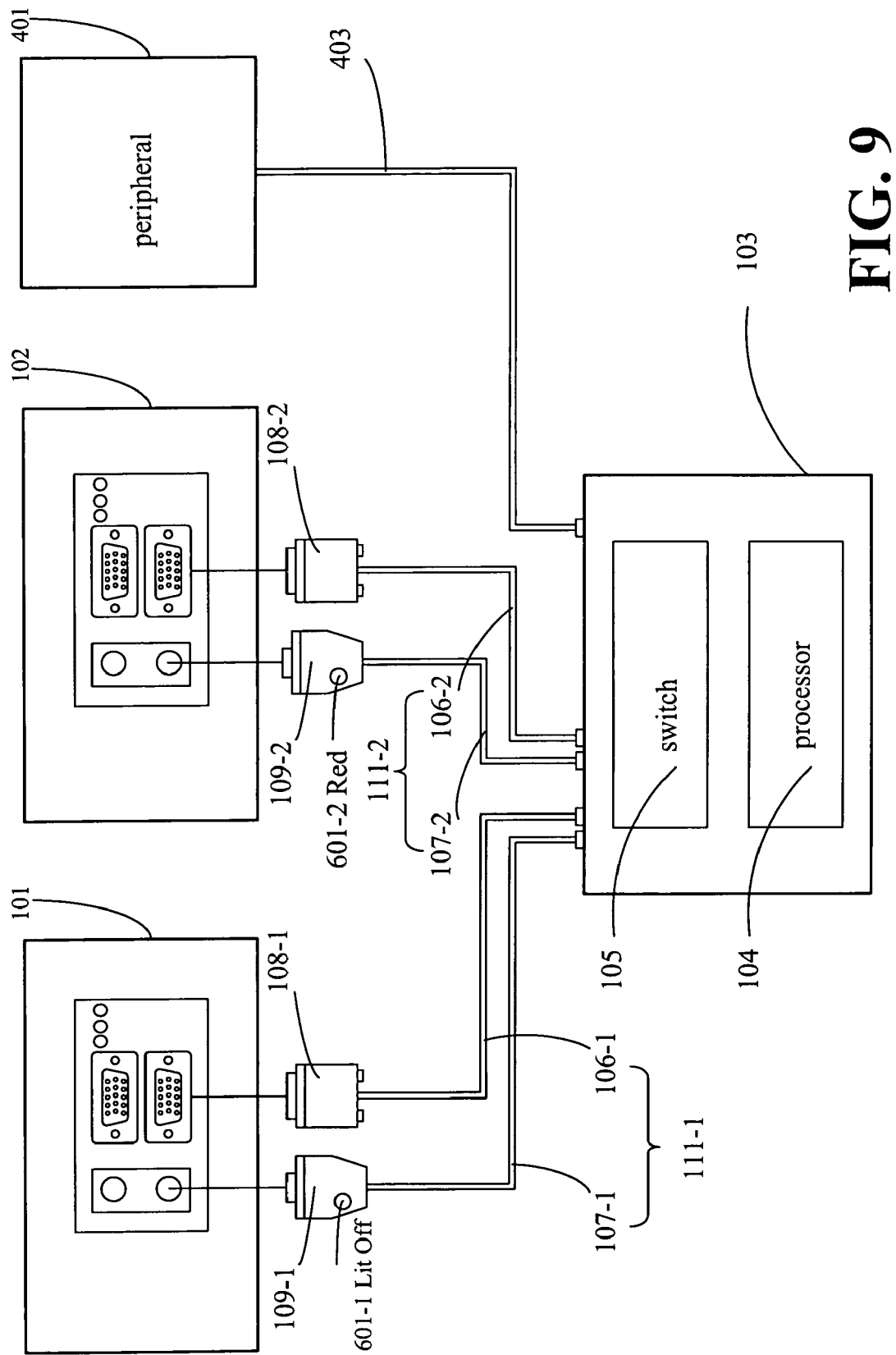

KEYBOARD-VIDEO-MOUSE CABLE HAVING INDICATOR FOR INDICATING SWITCHING STATUS

FIELD OF THE INVENTION

The present invention generally relates to a Keyboard-Video-Mouse (KVM) cable, and more particularly to a KVM cable having indicator for indicating switching status of a KVM switch.

BACKGROUND OF THE INVENTION

A Keyboard-Video-Mouse KVM switch is a common device, which is generally employed to manage a plurality of computers. One KVM switch can control up to eight or even more computers. Meanwhile, as many as additional KVM switches can be added in a daisy chain or a cascade configuration to allow up to hundreds of computers to be controlled from a console. The computers may also be placed in many different locations in many arranging conditions according to administrators. The wiring between the console and the plurality computers may become mazy.

When a trouble happens to the KVM switch, such as, an administrator switches the KVM switch to access one of the computers but no response can be recognized for trouble analysis at the console. The administrator needs to check the computer and the cables therebetween for troubleshooting. Especially, lots of computers are setup in a cluster. The mazy wiring can be a problem for the administrator to investigate the aforesaid troubleshooting.

Therefore, a KVM cable capable of indicating a switching status of the KVM switch for the computer coupled thereto can be a solution for the administrators by indicating the switching status close to the computers.

SUMMARY OF THE INVENTION

An example consistent with the present invention may provide a Keyboard-Video-Mouse (KVM) cable capable of indicating at least one switching status of a KVM switch for at least one computer coupled thereto. The KVM cable comprises at least one indicator disposed thereon for indicating at least one switching status of the KVM switch.

The KVM cable of the example consistent with the present invention may further comprise a set of transmission lines for transmitting indicating signals from the KVM switch to the indicator according to the switching status of the KVM switch. The KVM cable comprises a plurality of connectors. A first indicator may be disposed on a first connector for indicating the console switching status. A second indicator may be disposed on a second connector for indicating a peripheral switching status. Alternatively, the first and second indicators can be disposed on the same connector for indicating the console switching status and the peripheral switching status respectively.

Moreover, a color mixing LED, which is capable of displaying more than two colors may also be disposed on either of the first and second connectors for indicating the console switching status and the peripheral switching status. The color mixing LED indicates the console switching status and the peripheral switching status by different colors according to the indicating signals from the KVM switch.

The aforesaid first connector may be a D-sub VGA connector, a DVI connector or a HDMI connector and the second connector may be an USB connector. The first and second indicators may comprise a LED each.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 9 illustrates a schematic diagram of a sixth example consistent with the present invention which is capable of showing a console switching status and a peripheral switching status of a KVM switch for two computers coupled thereto, wherein color mixing LEDs for indicating the console and the peripheral switching statuses are disposed on second connectors of KVM cables.

DETAILED DESCRIPTION OF THE INVENTION

Figure 1:
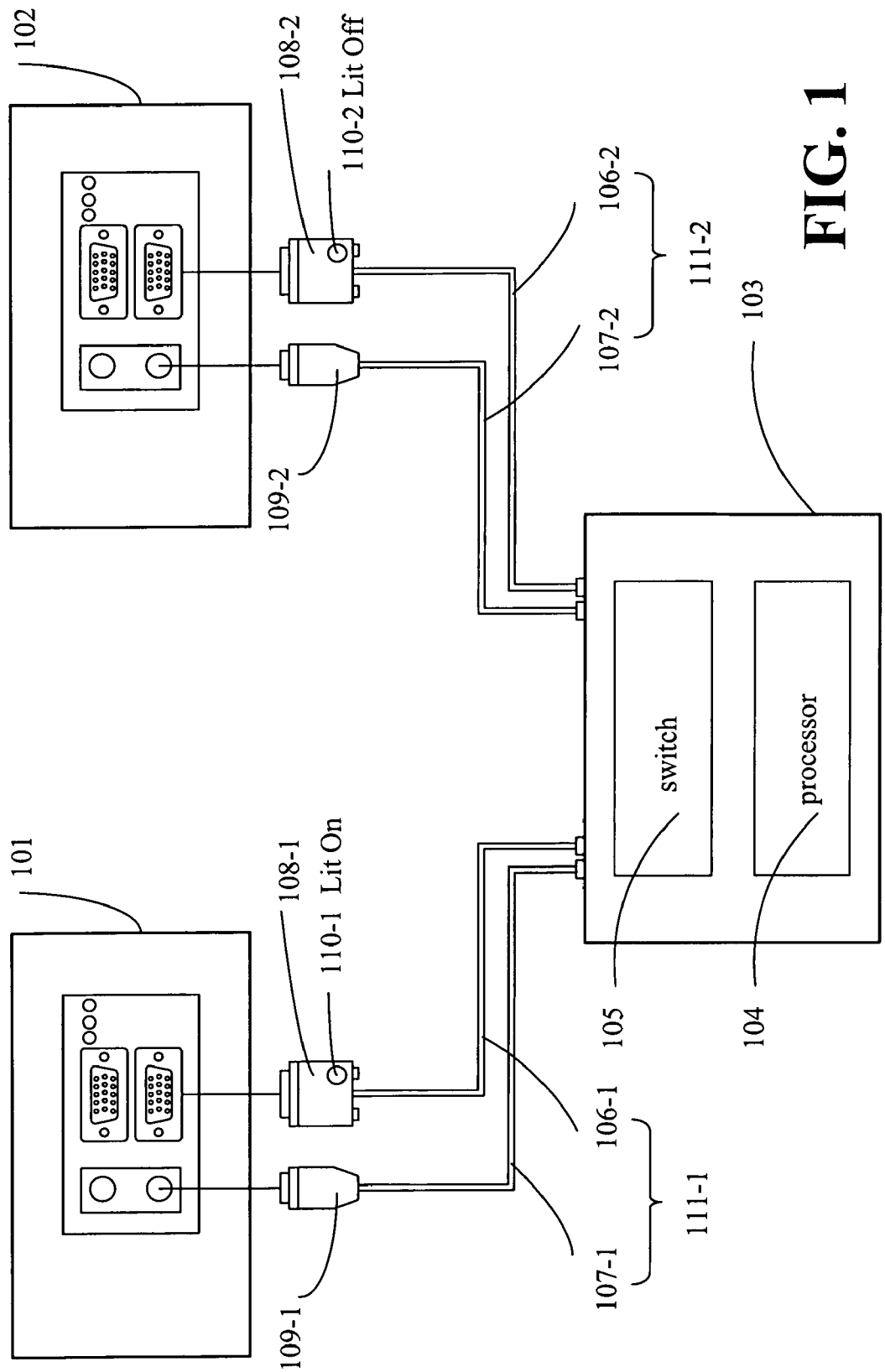
FIG. 1 illustrates a schematic diagram of a first example consistent with the present invention which is capable of showing a switching status of a KVM switch for two computers coupled thereto, wherein the indicators are disposed on first (D-sub) connectors of KVM cables.

Please refer to FIG. 1, which illustrates a schematic diagram of a first example consistent with the present invention which is capable of showing a switching status of a KVM switch 103 for two computers, the first computer 101 and the second computer 102 coupled thereto, wherein the first indicators 110-1 and 110-2 are disposed on D-sub connectors 108-1, 108-2 of KVM cables 111-1, 111-2 respectively according to the present invention. The KVM cable 111-1 comprises a video cable 106-1 and a USB cable 107-1 and the KVM cable 111-2 comprises a video cable 106-2 and a USB cable 107-2. The video cable 106-1 and the video cable 106-2 each comprises a first connector 108-1, 108-2. The USB cable 107-1 and the USB cable 107-2 each comprises a second connector 109-1, 109-2, i.e. USB connector. The KVM switch 103 comprises a processor 104 and a switch 105 for switching a console (not shown in FIG. 1) to access one of the computer 101 and the computer 102.

When the KVM switch 103 is switched to the first computer 101 by the console, the first indicator 110-1 disposed on the first connector 108-1 is lit on and the first indicator 110-2 disposed on the second connector 108-2 is lit off. Then, if the KVM switch 103 is switched from the first computer 101 to the second computer 102 by the console. The first indicator 110-2 then is lit on and the first indicator 110-1 is lit off.

By indicating the console switching status clearly and simply, the administrator of the KVM switch 103 can easily check the console switching status at the computer 101 or at the computer 102. Even the number of the computers comes to hundreds or thousands and setup in a cluster. No matter how mazy wiring between the computers and the KVM switch 103 is, the administrator still can easily tell which computer is being switched to be accessed by the console.

Figure 2:
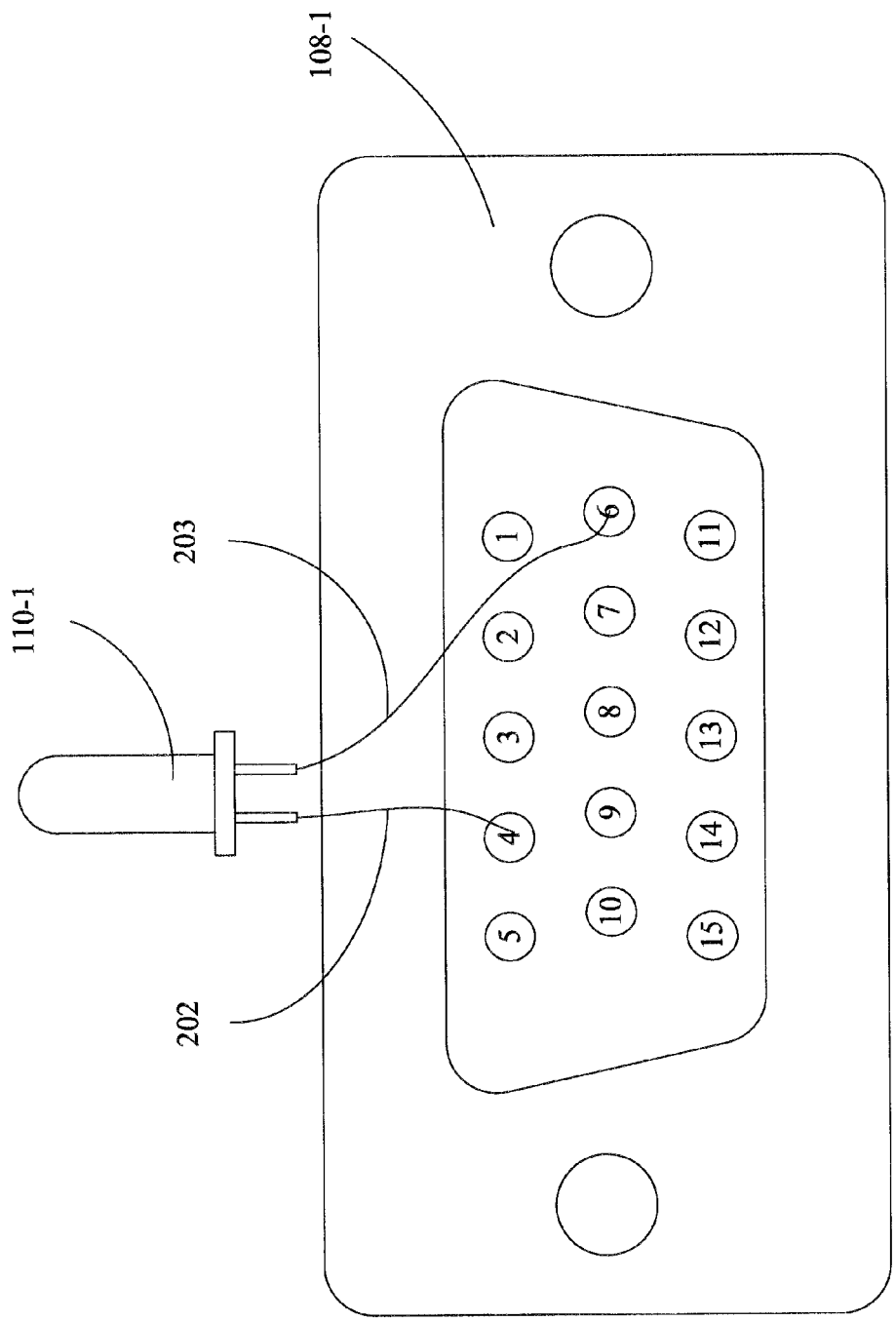
FIG. 2 shows a front view diagram of a D-sub connector shown in FIG. 1 and the wiring of the first indicator disposed thereon.

Please refer to FIG. 2. It shows a front view diagram of a D-sub connector 108-1 shown in FIG. 1 and the wiring of the first indicator 110-1 disposed thereon. In this example of using the D-sub connector 108-1, reserved pin 4 and ground pin 6 of the first indicator 110-1 of the video cable 106-1 may be employed for connecting a set of transmission lines 202, 203. The transmission lines 202, 203 transmit indicating signals from the KVM switch 103 to the first indicator 110-1 according to the console switching status of the KVM switch 103. Same as the first indicator 110-2 is mentioned.

The D-sub connectors 108-1 or 108-2 in the example may also be a DVI connector or a HDMI connector. The USB connectors 109-1, 109-2 may also be IEEE-1394 connectors. Other kinds of connectors may be further used for different communication interfaces and different peripherals, such as audio connectors. Alternatively, the KVM cable may also be a combined cable, such as a 3-in-1 cable, for transmitting keyboard-video-mouse signals. Accordingly, pins of the DVI connector or the HDMI connector can be employed for connecting the set of transmission lines 202, 203. Moreover, specific added pins may also be disposed on aforesaid connectors, for connecting the set of transmission lines 202, 203 to transmit the indicating signals from the KVM switch 103 to the first indicator 110-1, 110-2.

Figure 3:
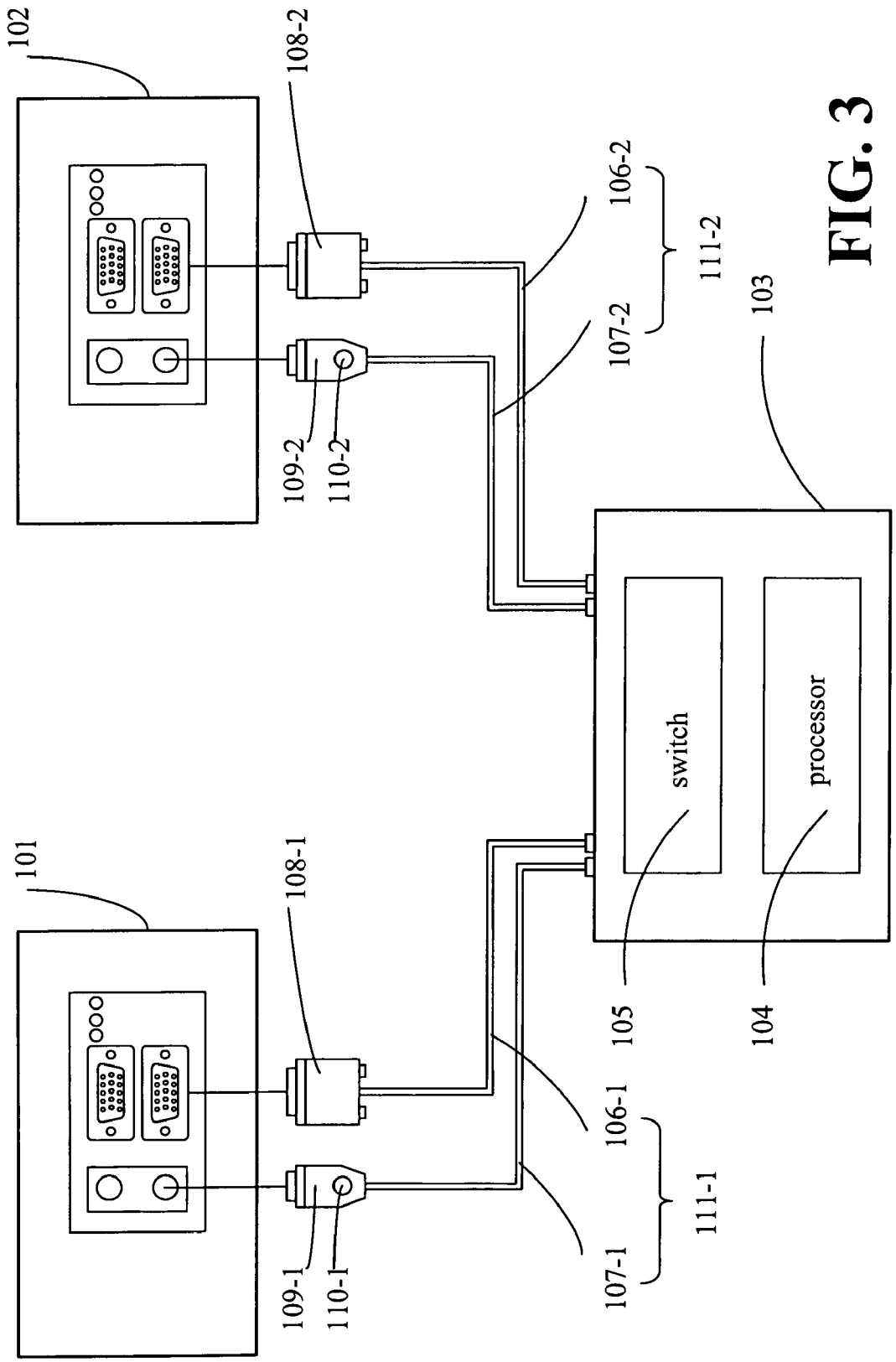
FIG. 3 illustrates a schematic diagram of a second example consistent with the present invention which is capable of showing a switching status of a KVM switch for two computers coupled thereto, wherein the indicators are disposed on second connectors of KVM cables.

Please refer to FIG. 3, which illustrates a schematic diagram of a second example consistent with the present invention which is capable of showing a switching status of a KVM switch 103 for the first and second computers 101, 102 coupled thereto, wherein first indicators 110-1, 110-2 are disposed on second connectors 109-1, 109-2 according to the present invention. In the second example, the USB cable 107-1 and the USB cable 107-2 can be keyboard/mouse cables. The second connectors 109-1, 109-2 can be USB connectors. Specifically, specific pins disposed on the second connectors 109-1, 109-2 are added for connecting a set of transmission lines 202, 203 (as shown in FIG. 2) to transmit indicating signals from the KVM switch 103 to the first indicators 110-1, 110-2. The USB connectors 109-1, 109-2 may also be IEEE-1394 connectors. Other kinds of connectors may be further used for different communication interfaces and different peripherals, such as audio connectors.

Figure 4:
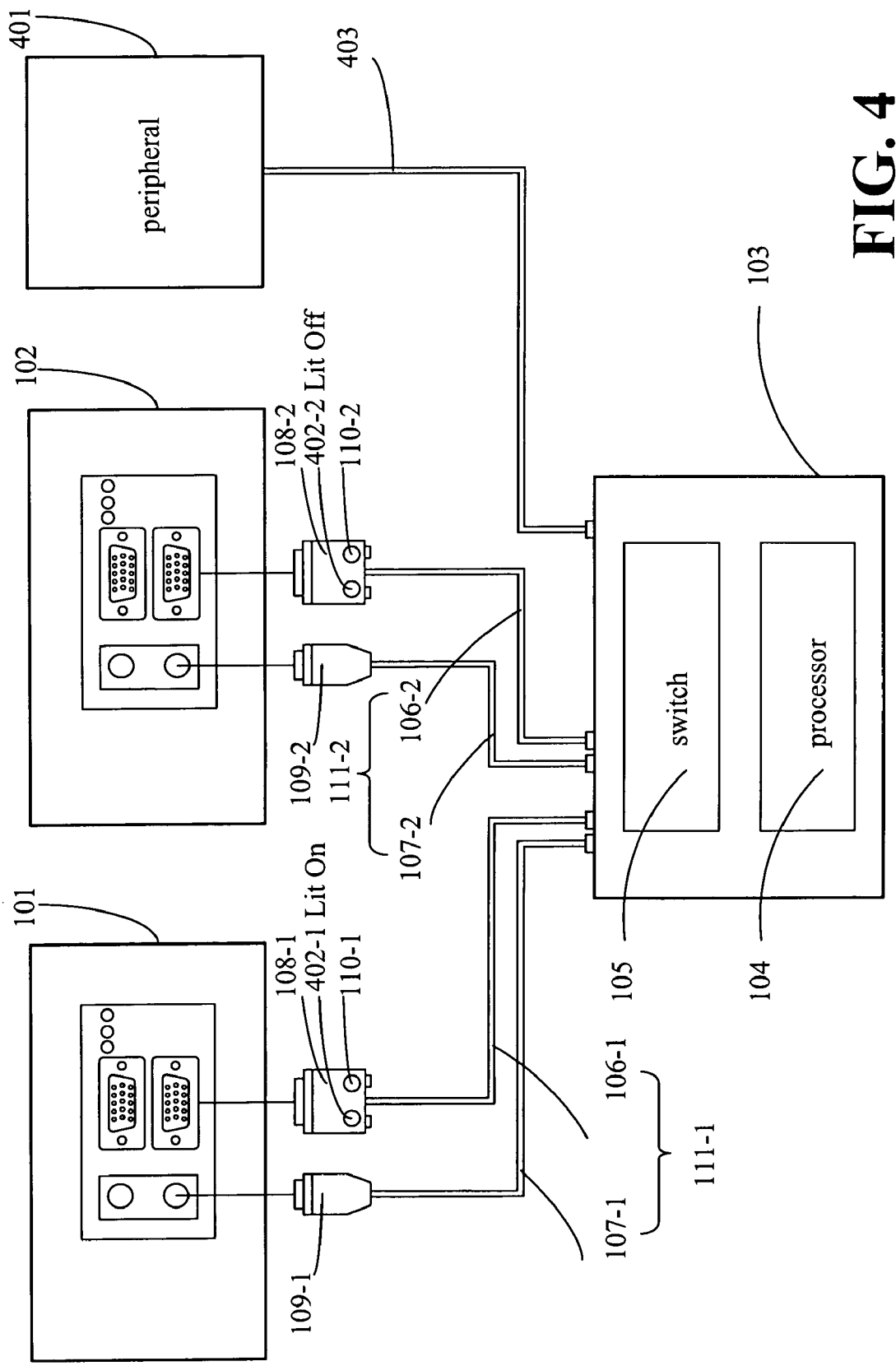
FIG. 4 illustrates a schematic diagram of a third example consistent with the present invention which is capable of showing a console switching status and a peripheral switching status of a KVM switch for two computers coupled thereto, wherein both first and second indicators for indicating the console and the peripheral switching statuses are disposed on first (D-sub) connectors of KVM cables.

Please refer to FIG. 4, which illustrates a schematic diagram of a third example consistent with the present invention which is capable of showing a console switching status and a peripheral switching status of a KVM switch 103 for the first and second computers 101, 102 coupled thereto, wherein both first indicators 110-1, 110-2 for indicating a console switching status and second indicators 402-1, 402-2 for indicating a peripheral switching status are disposed on D-sub connectors 108-1, 108-2 of KVM cables 111-1, 111-2 according to the present invention. The KVM switch 103 is further coupled with a peripheral 401 with a peripheral cable 403. Accordingly, in the third example, the KVM cable 111-1, 111-2 further comprises second indicators 402-1, 402-2 disposed on the first connectors 108-1, 108-2 respectively for indicating a peripheral switching status of the KVM switch 103.

When the KVM switch 103 is switched to the first computer 101 by a console, the first indicator 110-1 disposed on the first connector 108-1 is lit on and the first indicator 110-2 disposed on the second connector 108-2 is lit off. Meanwhile, as a data transmission procedure starts to be executed between the first computer 101 and the peripheral 401, the second indicator 402-1 is lit on and the second indicator 402-2 is lit off. Then, if the KVM switch 103 is switched from the first computer 101 to the second computer 102 but the data transmission procedure is ordered to be remaining. The first indicator 110-2 becomes lit on and the first indicator 110-1 becomes lit off; the second indicator 402-1 remains lit on and the second indicator 402-2 remains lit off.

Figure 5:
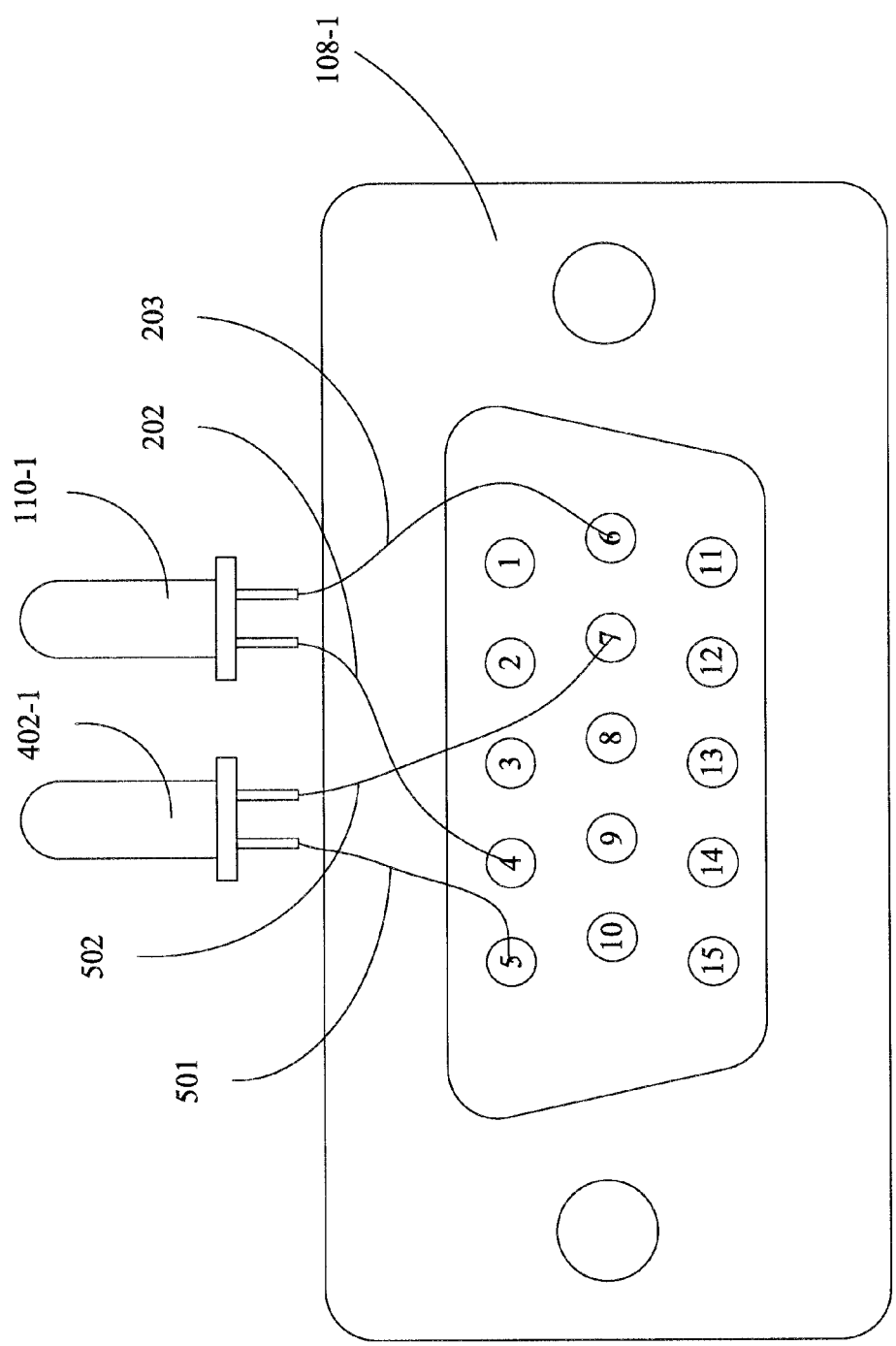
FIG. 5 shows a front view diagram of a D-sub connector shown in FIG. 4 and the wiring of the first and second indicators disposed thereon.

Please refer to FIG. 5. It shows a front view diagram of a D-sub connector 108-1 shown in FIG. 4 and the wiring of the first indicator 110-1 and the second indicator 402-1 disposed thereon. As same as aforementioned in the first example, the reserved pin 4 and ground pin 6 of the first indicator 110-1 of the video cable 106-1 can be employed for connecting a set of transmission lines 202, 203. Meanwhile, reserved pin 5 and ground pin 7 of the first connector 108-1 can be employed for connecting a set of transmission lines 501, 502. The transmission lines 202, 203 transmit indicating signals from the KVM switch 103 to the first indicator 110-1 according to the console switching status of the KVM switch 103. The transmission lines 501, 502 transmit indicating signals from the KVM switch 103 to the second indicator 402-1 according to the peripheral switching status of the KVM switch 103. Same as the first connector 110-2 is mentioned.

The D-sub connectors 108-1 or 108-2 in the present example may also be a DVI connector or a HDMI connector. Alternatively, the KVM cable may also be a 3-in-1 cable for transmitting keyboard-video-mouse signals. Alternatively, the first indicators 110-2, 110-2 can be disposed on the first connectors 108-1, 108-2 and the second indicators 402-1, 402-2 can be disposed on the second connectors 109-1, 109-2 respectively.

Figure 6:
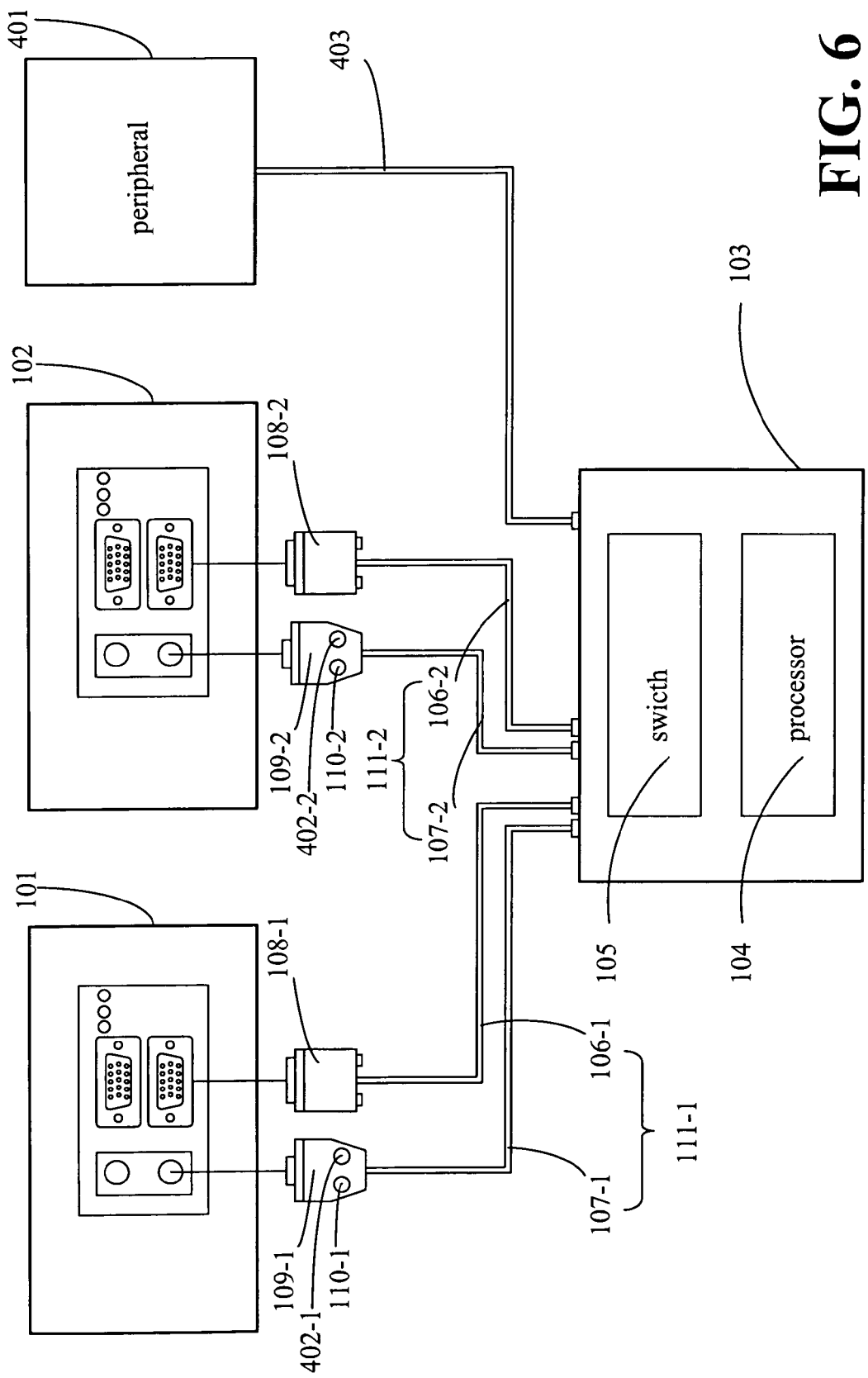
FIG. 6 illustrates a schematic diagram of a fourth example consistent with the present invention which is capable of showing a console switching status and a peripheral switching status of a KVM switch for two computers coupled thereto, wherein both the first and second indicators for indicating the console and the peripheral switching statuses are disposed on second connectors of KVM cables.

Please refer to FIG. 6, which illustrates a schematic diagram of a fourth example consistent with the present invention which is capable of showing a console switching status and a peripheral switching status of a KVM switch 103 for computers 101, 102 coupled thereto, wherein both the first indicators 110-1, 110-2 and the second indicators 402-1, 402-2 for indicating the console and the peripheral switching statuses are disposed on the second connectors 109-1, 109-2 of the KVM cables 111-1, 111-2. Similarly as described in the second example, the USB cable 107-1 and the USB cable 107-2 can be keyboard/mouse cables. The second connectors 109-1, 109-2 can be USB connectors. Furthermore, the connectors of the peripheral cable 403 may also be USB connectors.

Specifically, specific pins disposed on the second connectors 109-1, 109-2 may be added for connecting a set of transmission lines 202, 203 and the set of transmission lines 501, 502 (as shown in FIG. 5) to transmit indicating signals from the KVM switch 103 to the first indicators 110-1, 110-2 and the second indicators 402-1, 402-2.

Figure 7:
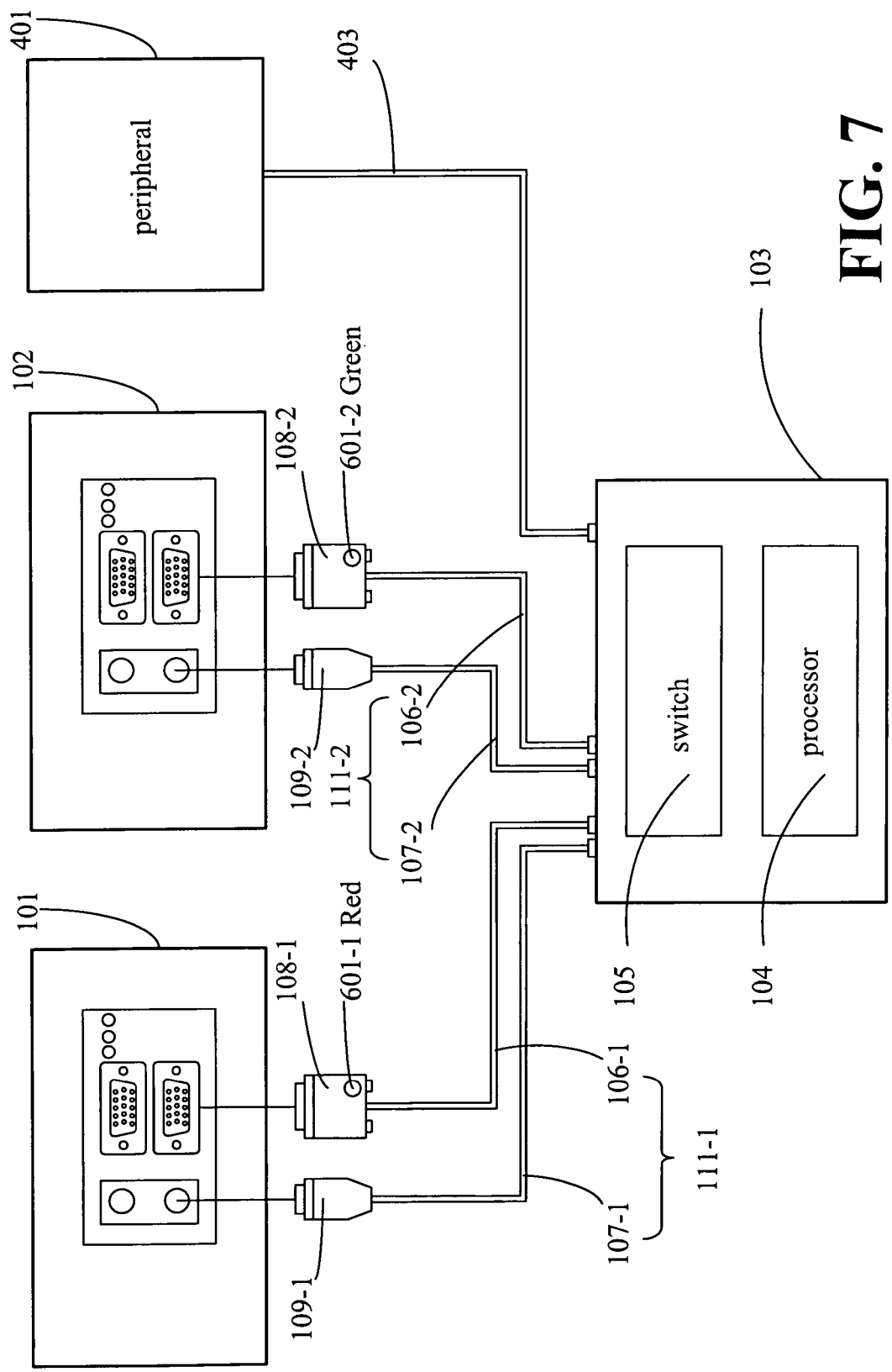
FIG. 7 illustrates a schematic diagram of a fifth example consistent with the present invention which is capable of showing a console switching status and a peripheral switching status of a KVM switch for two computers coupled thereto, wherein color mixing LEDs for indicating the console and the peripheral switching statuses are disposed on first (D-sub) connectors of KVM cables.

Please refer to FIG. 7, which illustrates a schematic diagram of a fifth example consistent with the present invention which is capable of showing a console switching status and a peripheral switching status of a KVM switch 103 for the first computer 101 and the second computer 102 coupled thereto, wherein color mixing LEDs 601-1, 601-2 for indicating the console and the peripheral switching statuses are disposed on first (D-sub) connectors 108-1, 108-2 of KVM cables 111-1, 111-2 according to the present invention. For example, the console switching status and the peripheral switching status indicated by colors of the color mixing LEDs 601-1, 601-2 can be defined as: "green" means the KVM switch 103 is switched to the computer by the console; "orange" means the peripheral is connected to the computer; "red" means both the peripheral and the console are connected to the computer at the same time; "lit off" means the computer is idle.

When the KVM switch 103 is switched to the first computer 101 by a console, the color mixing LED 601-1 disposed on the first connector 108-1 becomes "green" and the color mixing LED 601-2 disposed on the second connector 108-2 is lit off. Meanwhile, as a data transmission procedure starts to be executed between the first computer 101 and the peripheral 401, the color mixing LED 601-1 becomes "red" and the color mixing LED 601-2 remains lit off. Then, if the KVM switch 103 is switched from the first computer 101 to the second computer 102 but the data transmission procedure is ordered to be remaining. The color mixing LED 601-2 becomes "green" and the color mixing LED 601-1 becomes "orange" as shown in FIG. 7.

By indicating the console switching status and the peripheral switching status with the color mixing LED 601-1, 601-2, the administrator of the KVM switch 103 can easily check the console switching status and the peripheral switching status at the computer 101 or at the computer 102.

Figure 8:
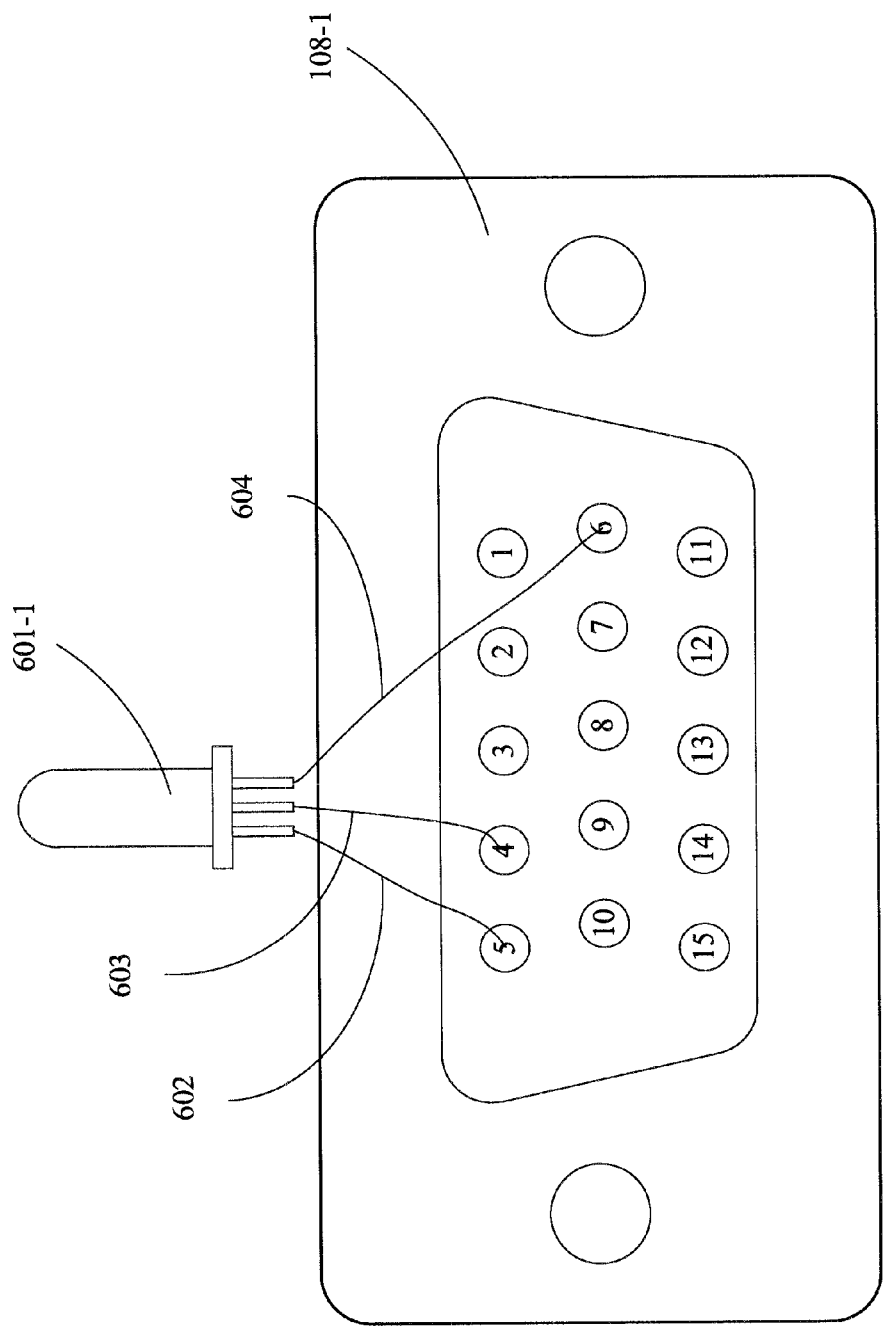
FIG. 8 shows a front view diagram of a D-sub connector shown in FIG. 7 and the wiring of the color mixing LED disposed thereon.

Please refer to FIG. 8. It shows a front view diagram of a D-sub connector 108-1 shown in FIG. 7 and the wiring of the color mixing LED 601-1 disposed thereon. As similar as aforementioned, reserved pin 4, reserved pin 5 and ground pin 6 of the first connector 108-1 can be employed for connecting a set of transmission lines 602, 603 and 604. The transmission lines 602, 603 and 604 transmit indicating signals from the KVM switch 103 to the color mixing LED 601-1 according to the console switching status and the peripheral switching status of the KVM switch 103. Same as the color mixing LED 601-2 is mentioned.

Please refer to FIG. 9, which illustrates a schematic diagram of a sixth example consistent with the present invention which is capable of showing a console switching status and a peripheral switching status of a KVM switch 103 for first computer 101 and the second computer 102 coupled thereto, wherein color mixing LEDs 601-1, 601-2 for indicating the console and the peripheral switching statuses are disposed on second connectors 109-1, 109-2 of KVM cables 111-1, 111-2 according to the present invention. Similarly as described in the fourth example, but the color mixing LED 601-2 is "red" and the color mixing LED 601-1 is "lit off". Therefore, the console switching status and the peripheral switching status shown in FIG. 9 means that the KVM switch 103 is switched to the second computer 102 and a data transmission is also being executed between the second computer 102 and the peripheral 401.

Moreover, all examples mentioned above are related with KVM cables. The present invention also apply to a Keyboard-Video-Mouse (KVM) switch having a plurality of cables connecting with a plurality of computers by the connectors thereof generally named as "Cable KVM".

Conclusively, according to the present invention, an administrator or a user of the KVM switch (or the Cable KVM) can easily check a console switching status and a peripheral switching status at the computers. Even the number of the computers setup in a cluster and no matter how mazy wiring between the computers and the KVM switch 103 is, the administrator or the user still can easily tell which computer is being switched to be accessed by the console and which computer is connected with the peripheral.

As is understood by a person skilled in the art, the foregoing preferred examples of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A Keyboard-Video-Mouse (KVM) cable capable of indicating at least one switching status of a KVM switch for a computer coupled thereto, the KVM cable comprising:
at least one indicator disposed on the KVM cable, indicating the switching status of the KVM switch; and
a set of transmission lines for transmitting indicating signals from the KVM switch to the indicator according to the switching status of the KVM switch.

2. The KVM cable of claim 1, wherein the indicator is disposed on one of a plurality of connectors of the KVM cable for indicating one of a console switching status and a peripheral switching status of the KVM switch.

3. The KVM cable of claim 2, wherein the plurality of connectors comprises a first connector and a first one of the at least one indicator is disposed on the first connector for indicating the console switching status.

4. The KVM cable of claim 3, wherein the first connector is selected from the group consisting of a D-sub VGA connector, a DVI connector and a HDMI connector.

5. The KVM cable of claim 2, wherein the plurality of connectors comprises a second connector and a second one of the at least one indicator is disposed on the second connector for indicating the peripheral switching status.

6. The KVM cable of claim 5, wherein the second connector is selected from the group consisting of an USB connector, an IEEE-1394 connector and an audio connector.

7. The KVM cable of claim 2, wherein the plurality of connectors comprises a second connector and a first one of the at least one indicator is disposed on the second connector for indicating the console switching status.

8. The KVM cable of claim 7, wherein the second connector is selected from the group consisting of an USB connector, an IEEE-1394 connector and an audio connector.

9. The KVM cable of claim 2, wherein the plurality of connectors comprises a first connector on which a first one and a second one of the at least one indicator are disposed for indicating the console switching status and the peripheral switching status of the KVM switch respectively.

10. The KVM cable of claim 9, wherein the first connector is selected from the group consisting of a D-sub VGA connector, a DVI connector and a HDMI connector.

11. The KVM cable of claim 2, wherein the plurality of connectors comprises a second connector on which a first one and a second one of the at least one indicator are disposed for indicating the console switching status and the peripheral switching status of the KVM switch respectively.

12. The KVM cable of claim 11, wherein the second connector is selected from the group consisting of an USB connector, an IEEE-1394 connector and an audio connector.

13. The KVM cable of claim 1, wherein the indicator comprises a LED.

14. The KVM cable of claim 2, wherein the indicator comprises a color mixing LED which is capable of displaying more than two colors for indicating the console switching status and the peripheral switching status of the KVM switch.

15. A Keyboard-Video-Mouse (KVM) switch having a plurality of cables connecting with a plurality of computers, each cable comprising:
   one or more connectors;
   at least one indicator disposed on at least one of the connectors, indicating at least one switching status of the KVM switch; and
   at least one set of transmission lines for transmitting indicating signals from the KVM switch to the indicator according to the switching status of the KVM switch.

16. The KVM switch of claim 15, wherein the indicator indicates one of a console switching status and a peripheral switching status of the KVM switch.

17. The KVM switch of claim 16, wherein the connectors comprise a first connector and a first one of the at least one indicator is disposed on the first connector for indicating the console switching status.

18. The KVM switch of claim 17, wherein the first connector is selected from the group consisting of a D-sub VGA connector, a DVI connector and a HDMI connector.

19. The KVM switch of claim 16, wherein the connectors comprise a second connector and a second one of the at least one indicator is disposed on the second connector for indicating the peripheral switching status.

20. The KVM switch of claim 19, wherein the second connector is selected from the group consisting of an USB connector, an IEEE-1394 connector and an audio connector.

21. The KVM switch of claim 16, wherein the connectors comprise a second connector and a first one of the at least one indicator is disposed on the second connector for indicating the console switching status.

22. The KVM switch of claim 21, wherein the second connector is selected from the group consisting of an USB connector, an IEEE-1394 connector and an audio connector.

23. The KVM switch of claim 16, wherein the connectors comprise a first connector on which a first one and a second of the at least one indicator are disposed for indicating the console switching status and the peripheral switching status of the KVM switch respectively.

24. The KVM switch of claim 23, wherein the first connector is selected from the group consisting of a D-sub VGA connector, a DVI connector and a HDMI connector.

25. The KVM switch of claim 16, wherein the connectors comprise a second connector on which a first one and a second one of the at least one indicator are disposed for indicating the console switching status and the peripheral switching status of the KVM switch respectively.

26. The KVM switch of claim 25, wherein the second connector is selected from the group consisting of an USB connector, an IEEE-1394 connector and an audio connector.

27. The KVM switch of claim 15, wherein the indicator comprises a LED.

28. The KVM switch of claim 16, wherein the indicator comprises a color mixing LED which is capable of displaying more than two colors for indicating for indicating the console switching status and the peripheral switching status of the KVM switch.

* * * * *